United States Patent
Hwang et al.

(10) Patent No.: US 7,662,902 B2
(45) Date of Patent: Feb. 16, 2010

(54) PHENOLIC RESIN WITH LOW LEVEL OF FREE BISPHENOL

(75) Inventors: Kuen Yuan Hwang, Hsinchu (TW); An Pang Tu, Hsinchu (TW); Chun Hsiung Kao, Hsinchu (TW); Fang Shian Su, Hsinchu (TW)

(73) Assignee: Chang Chun Plastics Co., Ltd., Taipei (TW)

( * ) Notice: Subject to any disclaimer, the term of this patent is extended or adjusted under 35 U.S.C. 154(b) by 310 days.

(21) Appl. No.: 11/594,866

(22) Filed: Nov. 9, 2006

(65) Prior Publication Data
US 2007/0299163 A1 Dec. 27, 2007

(30) Foreign Application Priority Data
Jun. 21, 2006 (CN) .............................. 95122260 A

(51) Int. Cl.
*C08G 8/20* (2006.01)
*C08L 63/00* (2006.01)
*C08L 63/02* (2006.01)

(52) U.S. Cl. .................... 528/140; 525/481; 525/510; 528/141; 528/142; 528/143; 528/147; 528/153

(58) Field of Classification Search ............. None
See application file for complete search history.

(56) References Cited

U.S. PATENT DOCUMENTS 4,278,579 A * 7/1981 Murphy .................. 524/510
4,722,982 A * 2/1988 Tanaka ................... 525/481

FOREIGN PATENT DOCUMENTS

JP   62-15216 A * 1/1987
JP   62-15217 A * 1/1987

* cited by examiner

*Primary Examiner*—Robert Sellers
(74) *Attorney, Agent, or Firm*—Birch, Stewart, Kolasch & Birch, LLP.

(57) ABSTRACT

A phenolic resin having not more than 5 wt% of free bisphenol and a molecular weight distribution Mw/Mn of not more than 2.0 is prepared by reacting a bisphenol and aldehyde in the presence of an alkaline catalyst at a temperature of from 0° C. to 100° C., neutralizing with an acid, adding an acid to adjust the pH to from 0 to 6, heating to a temperature of from 50° C. to 200° C, and vacuuming to recover the phenolic resin.

7 Claims, No Drawings

PHENOLIC RESIN WITH LOW LEVEL OF FREE BISPHENOL

FIELD OF THE INVENTION

The invention relates to a phenolic resin, which is characterized that the content of a free bisphenol in the phenolic resin is not more than 5 wt %, and it has a narrow molecular weight distribution (Mw/Mn) that is not more than 2.0.

The present invention also relates to a method for fabricating the phenolic resin described above, as well as an epoxy resin composition, which employs the phenolic resin of the present invention as a curing agent.

The phenolic resin fabricated according to the method of the present invention can be utilized as a curing agent for epoxy resins or as an adhesive; it can be applied to areas like printed circuit boards, composite laminated plate, molding, and shaping materials.

DESCRIPTION OF PRIOR ART

Currently, the bisphenol A phenolic resin in the commercialized phenolic resins is obtained by allowing bisphenol A (BPA) and formaldehyde to undergo condensation and dehydration reactions under the presence of acidic catalysts; it is mainly employed as a curing agent for the epoxy resins, and has excellent heat resistance and electrical properties.

Because of these advantages, the epoxy resins that employ phenolic resin as their curing agent have been extensively applied to the making of laminated plates. Using this type of phenolic resin as a curing agent and combine it with epoxy resins, hardening agents, various additives and solvents to prepare phenolic novolac resins, then soaking fiber sheets into the prepared solution, followed by lamination to produce laminated plates. The resultant laminated plate has excellent heat resistance, machinability, and electrical properties.

However, from the condensation and dehydration reactions between bisphenol A and formaldehyde in the presence of acidic catalysts, there is approximately 10 to 20 wt % of unreacted bisphenol A monomers remaining in the resulted bisphenol A phenolic novolac resin, which have negative influence on the future uses of the epoxy resins.

Therefore, JPA Sho 62-15216 disclosed a bisphenol A phenolic resin which characteristic is that when 1 mole of phenol compound reacts with 0.7 to 0.9 moles of formaldehyde, the content of the phenolic compound monomer contained therein is less than 10 wt %. Moreover, a method for fabricating a bisphenol A phenolic resin was disclosed in JPA Sho 62-15217; in which 1 mole of bisphenol A is heated in the presence of acidic catalysts, and continuously heated in toluene that is 25 to 400 wt % relative to the weight of bisphenol A; once the temperature exceeds 80° C., the solution is divided into a light-liquid layer (the top layer) and a heavy-liquid layer (the bottom layer); then the heavy-liquid layer is separated out and toluene is removed from it. The bisphenol A phenolic resin disclosed in JPA Sho 62-15216 is produced by employing the method disclosed in JPA Sho 62-15217.

In addition, JPA Hei 01-240511 also disclosed a method for fabricating bisphenol A phenolic resin having a number average molecular weight of between 600 to 2000, which utilizes bisphenol A phenolic resin containing 30 to 60 wt % of bisphenol A monomers and having a number average molecular weight of between 250 to 350 (and recovered bisphenol A). The method comprises reacting of bisphenol A monomer and formaldehyde in a mole ratio of 1:0.7~0.95 in the presence of acidic catalysts. When the number average molecular weight comes between 250-350, the recycled bisphenol A is refilled to enter further reactions, the reaction mixture is stirred in the presence of toluene and then left undisturbed; once the mixture is separated into two layers, the bottom layer is separated out and toluene contained therein has been removed. The recycled bisphenol A is derived from the following procedures: firstly allowing 1 mole of bisphenol A monomers to react with 0.4-0.8 moles of formaldehyde, and the resulted resin is heated in the presence of toluene that is 25 to 400 wt % relative to bisphenol A monomers. Once it is heated to 80-110° C., the mixture is divided into a light-liquid layer (the top layer) and a heavy-liquid layer (the bottom layer); then the light-liquid layer is separated out and toluene is removed from it.

In the bisphenol A phenolic resin fabricated in accordance with the prior arts described above, the content of un-reacted bisphenol A is still high, and can even exceed 20 wt %. On the other hand, because the reaction mixture is divided into two layers by adding solvents, it needs an additional solvent recycling step and raises certain safety issues due to the need to use the solvents.

Moreover, due to economic and production considerations, the current mechanical and electronic components, as well as semi-conductor devices; are mainly packaged by material based on epoxy resin composition or phenolic resin composition. In order to ensure safe usage, the mechanical and electronic components, and the semi-conductor devices must fulfill the flame retardancy requirement specified by UL. To meet the flame retardancy requirement, the current flame retardant epoxy resins mainly employ dicyandiamide (DICY) as the curing agent because of its excellent heat resistance and electrical properties. Such advantages have made flame retardant epoxy resins to be extensively applied to fields like manufacturing copper clad laminate and composite laminated plate.

However, in the field of making laminated plates, there are many requirements that need to be satisfied in order to successfully produce a laminated plate; such as the resin curability, heat resistance of a cured resin, drilling ability and workability of the laminated plate, water-resistances, electrical properties, color tone stability, and the durability of resin varnish. The epoxy resins composition using DICY as the curing agent cannot fully satisfy the requirements of making laminated plates as described above.

Furthermore, in order to meet the demand of environmental conservation, most of the surface mounting technology (SMT) has shifted to lead-free processing, and the temperature for assembling the components has been increased about 20-30° C. As a result, the IPC is planning to raise Td to more than 330° C., this not only meets the demand for lead-free solder, but also improves the heat resistance.

Therefore, the present invention intends to provide a phenolic resin, which has a narrow molecular distribution and a low amount of free bisphenol, and can be used as the curing agent for epoxy resins or as an adhesive. Moreover, the epoxy resin composition that utilizes the phenolic resin of the present invention can meet the requirement of Td>330° C. and maintain high glass transition temperature (Tg), thereby improving the heat resistance and reliability of epoxy resins.

SUMMARY OF THE INVENTION

The invention proposes a phenolic resin, which is characterized that the content of free bisphenol contained in the phenolic resin is not more than 5 wt %, and it has a narrow molecular weight distribution (Mw/Mn) being not more than 2.0.

The invention also proposes a method for fabricating the phenolic resin, which is a two-step method, comprising:

(a) reacting bisphenols with aldehydes in the presence of alkaline catalysts at a temperature of from 0 to 100° C. for 1 to 10 hours, subsequently resulting in a reactive resin;

(b) subsequently, neutralizing the reactive resin by utilizing acids, followed by the addition of phenols, then adding further acids to adjust the pH value of the reaction mixture falling between 0 to 6 and stirred for 0.5 to 2 hours, then heating the mixture at a temperature of between 50 to 200° C. and recovered under vacuum to give the phenolic resin of the invention.

The present invention further relates to an epoxy resin composition, in which the phenolic resin of the present invention is used as a curing agent.

DETAILED DESCRIPTION OF PREFERRED EMBODIMENT

In step (a) of the method according to present invention, the bisphenols and aldehydes are used in an amount of from 0.66 to 0.95 equivalent moles of active hydrogen of bisphenols; preferably between 0.7 to 0.9 moles relative to 1 mole of aldehydes.

In step (a) of the method according to present invention, examples of the bisphenols includes bisphenol A, bisphenol F, bisphenol E, bisphenol S, bisphenol Z, and bisphenol C; and among them, bisphenol A is preferable.

In step (a) of the method according to present invention, examples of the aldehydes include formaldehyde, aqueous formaline, paraformaldehyde, trioxane, acetaldehyde, polyoxymethylene (POM), or propionaldehyde, and among them formaldehyde and paraformaldehyde are preferable.

In step (a) of the method according to present invention, examples of the alkaline catalysts include sodium hydroxide, potassium hydroxide, barium hydroxide, and calcium hydroxide, which is used in an amount of from 0.1 to 2.0 moles, and preferably from 0.4 to 1.0 moles, relative to 1 mole of bisphenols. If more than 2.0 moles of alkaline catalyst is used, it is no longer cost-effective because the yield cannot be elevated further; whereas if less than 0.1 moles is used, the reaction rate would be slowed down significantly.

In step (a), the reaction of bisphenols and aldehydes is conducted at a temperature of from 0 to 100° C., and preferably from 40 to 60° C. If the reaction temperature is too low, the reaction would be slowed down and result in overlong reaction time; while if the temperature is too high, the molecular weight of the reaction product would become too large and is unsuitable for use.

In step (b) of the method according to the present invention, any organic acids or inorganic acids can be employed in the neutralization reaction, for instance, inorganic acids like sulfuric acid, hydrochloric acid, phosphoric acid, and nitric acid; or organic acids like p-toluenesulfonic acid, acetic acid, oxalic acid, and formic acid.

The neutralization reaction in step (b) of the method according to the present invention can be carried out at a temperature of between 20 to 100° C.

Examples of the phenols used in step (b) include phenol, o-methylphenol, m-methylphenol, p-methylphenol, para-tert-butyl benzene, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol, and phenol and methylphenols are preferable.

The acids used in step (b) to adjust the pH value of the reaction mixture can be either any organic acids or inorganic acids; for example, inorganic acids like sulfuric acid, hydrochloric acid, phosphoric acid, and nitric acid; or organic acids like p-toluenesulfonic acid, acetic acid, oxalic acid, and formic acid.

According to the two-step method of the present invention, a phenolic resin containing free bisphenol A in an amount of less than 5 wt %, and having a narrow molecular weight distribution (Mw/Mn) that is not more than 2.0 can be obtained.

In the method of the present invention, the content of free bisphenol in the resultant phenolic resin is determined by carrying out $^1$H NMR analysis on the obtained phenolic resin. The content of free bisphenol is derived from the ratio of the peak areas for the methyl group of free bisphenol to the peak area for the methylene resulted from condensing bisphenol and formaldehyde, in the NMR spectrum, and converting into molecular weight.

Moreover, in the present invention, the weight average molecular weight and the number average molecular weight are determined by a gel permeation chromatography (GPC) (Model Waters-600 manufactured by Waters Corporation) and converted into polystyrene.

In the phenolic resin of the present invention, since the amount of free bisphenol A remaining in the phenolic resin is less than 5 wt % and its molecular weight distribution (Mw/Mn) is not more than 2.0, when the phenolic resin is used as a curing agent for epoxy resins, the cured product obtained from the resultant epoxy resin composition not only meets the requirement of $T_d$>330° C. ($T_d$ is the temperature at which a substance suffers 5% weight loss in a thermal gravimetric analyzer (TGA)), but also maintains excellent glass transition temperature ($T_g$), thereby improving its heat resistance and reliability.

In the present invention, the softening point of the phenolic resin is measured by a softening point analyzer, in which a plane-top needle with the specified loading and a cross-section area of 1 mm² is placed on a sample prepared from phenolic resin, the softening point (Vicat softening temperature) is the temperature when the needle penetrates 1 mm into the sample.

The epoxy resin that employs the phenolic resin of this invention as a curing agent can be applied to printed circuit board and composite laminated plate.

Therefore, the invention also provides an epoxy resin composition, which is characterized by using the phenolic resin fabricated by the method of this invention as a curing agent.

Furthermore, the invention also provides a laminated plate, which is produced by immersing a fiber sheet into the epoxy resin composition of the invention and then cured.

In regard to the epoxy resins used in the epoxy resin composition of the invention, they can be any epoxy resins. But in terms of flame retardancy, flame-retardant epoxy resins are preferred; for example, it can be at least one selected from the group consisting of novolac resin type epoxy resins such as cresol novolac epoxy resin and phenol novolac epoxy resin; bisphenol type epoxy resins such as bisphenol A type epoxy resin, bisphenol F type epoxy resin, and bisphenol S type epoxy resin; biphenyl type epoxy resin such as biphenyl-4,4'-glycidyl ether epoxy resin; 3,3',5,5'-tetramethylbiphenyl-4,4'-glycidyl ether epoxy resins; aromatic epoxy resin containing 3 to 4 functional groups such as tetra-(1,2-epoxypropyloxyphenyl)-ethane; biphenol type epoxy resins, dimethylphenol type epoxy resins, dicyclopentadiene type epoxy resins, naphthalene type epoxy resins, di-styrene type epoxy resins, sulfur-containing epoxy resins, halogen-containing epoxy resins, and phosphor-containing epoxy resins; the said resins can be used alone or in a mixture of two or more types of resins.

In the epoxy resin composition of the invention, the amount of phenolic resin of the invention to be used as a curing agent depends on its active hydrogen equivalent weight, the type of epoxy resins used, and their epoxy resin equivalent weight. Generally, the phenolic resin is used in an amount such that the ratio of the epoxy equivalent weight of the epoxy resin to the active hydrogen equivalent weight of the curing agent (epoxy equivalent weight:active hydrogen equivalent weight) is from 1:0.5 to 1:1.5; preferably from 1:0.6 to 1:1.4, and more preferably from 1:0.7 to 1:1.3.

In the epoxy resin composition of the invention, in addition to the present phenolic resin as curing agent and epoxy resins, it is possible to contain other curing agents, curing promoter, inorganic fillers, coupling agents, colorants (such as carbon black and iron oxide), releasing agents, and low-stress additives, which are well-known in epoxy resin field.

When other curing agents other than the novel phenolic resin of the invention are used, it is used in amount such that the ratio of epoxy equivalent weight of the epoxy resins to active hydrogen equivalent weight of curing agents falls in the range described above.

As for other curing agents, it is appropriate to use known curing agents that are generally applied to epoxy resin composites. For instance, they can be novolac type phenol resins, arylalkyl type phenol resins, dicyclopentadiene type phenol resins, biphenyl type phenol resins, phenol type epoxy resins, triphenylmethane type phenol resins, bisphenol resins, polyhydroxyphenol resins, phenol-aldehyde, acetic anhydride, and phenylalkyl polyamines. These curing agents can be used alone or in a mixture of two or more in combination with the phenolic resin of the invention.

The curing promoter used in the present epoxy resin composition can be a well-known curing promoter used in epoxy resin field without any limitations; for example, this includes cyclic imidazole compounds, maleic anhydride or quininone compounds, tertiary amines and their derivatives, imidazole and their derivatives, phosphor compounds, tetraphenyl boronate and its derivatives; such as tertiary amines, tertiary phosphines, quaternary ammonium salts, phosphonium salts, boron trifluoride complexes, lithium compounds or imidazole compounds, or their mixtures.

The inorganic fillers can be ball-type and horn-type fused silicon oxides, crystalline silicon oxides, quartz glass powder, talcum powder, aluminum oxide powder, zinc borate, aluminum hydroxide, magnesium hydroxide, zirconia, calcium silicate, calcium carbonate, potassium titanate, silicon carbide, silicon nitride, aluminum nitride, boron nitride, beryllium oxide, zirconium oxide, aluminum olivine, steatite, spinel, mullite, and titanium oxide. These fillers can be used alone or in a mixture of two or more fillers. It is preferably a ball-type fused silicon oxide, horn-type fused silicon oxide, crystalline silicon oxide, and a mixture of ball-type silicon oxide, horn-type fused silicon oxide and crystalline silicon oxide.

The invention can be further illustrated by reference to the following examples, however, the examples only serve the purpose of illustration and are not to be used to limit the scope of the invention in any ways.

EXAMPLE 1

The Preparation of Phenolic Resin According to the Invention 114 g (0.5 moles) of bisphenol A, 84.2 g of 37% formaldehyde aqueous solution (1.05 moles), and 100 g of 20 wt % NaOH (0.5 moles) were charged into a 1-liter separable reactor equipped with a cooler, a stirrer, and a heating device. Once mixed, the mixture was heated to 50° C. and allowed to react for further 3 hours. Then 57 g of 32 wt % HCl (0.5 moles) was added to make the pH value of the mixture neutral, this was followed by the addition of 150.4 g (1.6 moles) of phenol and 1.5 g (0.03 moles) of oxalic acid, thus raising the pH value of the mixture to 5.5. Next, the mixture was heated to 100° C. and stirred for 1 hour, then heated further to 170° C. under a vacuum to recycle un-reacted monomers and obtain 182 g of a resin (A) with a softening point of 118.8° C., in which the weight of the remaining bisphenol A was 3.9 wt %, its weight average molecular weight (Mw) was 2073, its number average molecular weight (Mn) was 1150, and its molecular weight distribution (Mw/Mn) was 1.79, with the active hydrogen equivalent weight ranging between 110 to 120 g/equivalent weight.

EXAMPLE 2

The Preparation of Phenolic Resin According to the Invention 114 g (0.5 moles) of bisphenol A, 84.2 g of 37% formaldehyde aqueous solution (1.05 moles), and 100 g of 20 wt % NaOH (0.5 moles) were charged into a 1-liter separable reactor equipped with a cooler, a stirrer, and a heating device. Once mixed, the mixture was heated to 50° C. and allowed to react for further 3 hours. Then 57 g of 32 wt % HCl (0.5 moles) was added to make the pH value of the mixture neutral, this was followed by the addition of 282 g (3.0 moles) of phenol and 1.5 g (0.03 moles) of oxalic acid, thus raising the pH value of the mixture to 5.5. Next, the mixture was heated to 100° C. and stirred for 1 hour, then heated further to 170° C. under a vacuum to recycle un-reacted monomers and obtain 194 g of a resin (B) with a softening point of 105.4° C., in which the weight of the remaining bisphenol A was 4.9 wt %, its weight average molecular weight (Mw) was 1205, its number average molecular weight (Mn) was 939, and its molecular weight distribution (Mw/Mn) was 1.28, with the active hydrogen equivalent weight ranging between 110 to 120 g/equivalent weight.

EXAMPLE 3

The Preparation of Phenolic Resin According to the Invention 114 g (0.5 moles) of bisphenol A, 84.2 g of 37% formaldehyde aqueous solution (1.05 moles), and 100 g of 20 wt % NaOH (0.5 moles) were charged into a 1-liter separable reactor equipped with a cooler, a stirrer, and a heating device. Once mixed, the mixture was heated to 50° C. and allowed to react for further 3 hours. Then 57 g of 32 wt % HCl (0.5 moles) was added to make the pH value of the mixture neutral, this was followed by the addition of 172.8 g (1.6 moles) of o-cresol and 1.5 g (0.03 moles) of oxalic acid, thus raising the pH value of the mixture to 5.5. Next, the mixture was heated to 100° C. and stirred for 1 hour, then heated further to 170° C. under a vacuum to recycle un-reacted monomers and obtain 214 g of a resin (C) with a softening point of 109.2° C., in which the weight of the remaining bisphenol A was 4.3 wt %, its weight average molecular weight (Mw) was 1428, its number average molecular weight (Mn) was 1020, and its molecular weight distribution (Mw/Mn) was 1.40, with the active hydrogen equivalent weight ranging between 110 to 120 g/equivalent weight.

EXAMPLE 4

The Preparation of Phenolic Resin According to the Invention 114 g (0.5 moles) of bisphenol A, 120.3 g of 37% formaldehyde aqueous solution (1.5 moles), and 100 g of 20 wt % NaOH (0.5 moles) were charged into a 1-liter separable reactor equipped with a cooler, a stirrer, and a heating device. Once mixed, the mixture was heated to 50° C. and allowed to react for further 3 hours. Then 57 g of 32 wt % HCl (0.5 moles) was added to make the pH value of the mixture neutral, this was followed by the addition of 240 g (2.55 moles) of phenol and 1.5 g (0.03 moles) of oxalic acid, thus raising the pH value of the mixture to 5.5. Next, the mixture was heated to 100° C. and stirred for 1 hour, then heated further to 170° C. under a vacuum to recycle un-reacted monomers and obtain 245 g of a resin (D) with a softening point of 127.8° C., in which the weight of the remaining bisphenol A was 1.2 wt %, its weight average molecular weight (Mw) was 2418, its number average molecular weight (Mn) was 1204, and its molecular weight distribution (Mw/Mn) was 1.90, with the active hydrogen equivalent weight ranging between 110 to 120 g/equivalent weight.

COMPARATIVE EXAMPLE 1

228 g (1.0 moles) of bisphenol A, 48.1 g of 37% formaldehyde aqueous solution (0.6 moles), and 1.5 g (0.03 moles) of oxalic acid were stirred and mixed in a 1-liter separable reactor equipped with a cooler, a stirrer, and a heating device, the temperature of the mixture was heated to reflux temperature and allowed to react for another 4 hours. Next, the reactor was vacuumed to remove water from the mixture to give 210 g of a resin (E) with a softening point of 121.0° C., in which the weight of the remaining bisphenol A was 16.4 wt %, its weight average molecular weight (Mw) was 1738, its number average molecular weight (Mn) was 791, and its molecular weight distribution (Mw/Mn) was 2.20, with the active hydrogen equivalent weight ranging between 110 to 120 g/equivalent weight.

EXAMPLES 5 TO 7 AND COMPARATIVE EXAMPLE 2

According to the weight ratio shown in Table 1, the phenolic resins (A)—(C) and (E) from Examples 1-3 and Comparative Example 1, as the curing agent, were each mixed with cresol novolac epoxy resin (1) (sold by Chang Chun Plastics Co., LTD., under a product number CNE-200, epoxy equivalent weight=198 g/equivalent weight) and triphenylphosphine (TPP) as a curing promoter to obtain epoxy resin compositions, respectively. The compositions were then cured at an elevated temperature to obtain epoxy cured articles. They were then determined their glass transition temperature (Tg) and water absorption rate (%), and the results were shown in Table 1 as follows.

TABLE 1

|  | Example 5 | Example 6 | Example 7 | Comparative Example 2 |
|---|---|---|---|---|
| Epoxy resin (1) | 200 | 200 | 200 | 200 |
| Phenolic resin (A) | 110 |  |  |  |
| Phenolic resin (B) |  | 110 |  |  |
| Phenolic resin (C) |  |  | 110 |  |
| Phenolic resin (E) |  |  |  | 120 |
| Triphenylphosphine | 2 | 2 | 2 | 2 |
| Tg (° C.) | 182 | 175 | 177 | 165 |
| Water absorption rate (%) | 1.3 | 1.2 | 1.4 | 1.3 |

From the Table 1, it is shown that the epoxy resin composition using the phenolic resins prepared according to the method of the invention as curing agents can produce a curing epoxy resin articles having higher Tg, and their water absorption rate is comparable with that of the ones from the prior art.

The following paragraphs show the results by using the phenolic resins prepared according to the method of the invention, which have low amount of free bisphenol A and narrow molecular distribution, as curing agent in the combination with lowly-brominated epoxy resin, brominated epoxy resin with high Tg, and halogen-free epoxy resin.

The epoxy resins and curing agents used in the following examples are described as follows:

Epoxy resin 2: it is a low bromine epoxy resin with a Tg of 150° C., manufactured by Chang Chun Plastics Co., LTD., under a product number BET550A80, and the epoxy equivalent weight is 400-430 g/equivalent weight;

Epoxy resin 3: it is a brominates-containing epoxy resin with a high Tg, manufactured by Chang Chun Plastics Co., Ltd., under product number BNE200A70, and the epoxy equivalent weight is 190-210 g/equivalent weight;

Epoxy resin 4: it is a halogen-free phosphorus-containing epoxy resin, manufactured by Chang Chun Plastics Co., Ltd., under product number BEP330A70, and the epoxy equivalent weight is 450-480 g/equivalent weight;

Epoxy resin 5: it is a high bromine epoxy resin, manufactured by Chang Chun Plastics Co., Ltd., under product number BB400T60, and the epoxy equivalent weight is 385415 g/equivalent weight;

Epoxy resin 6: it is a high-Tg epoxy resin with UV shied, manufactured by Chang Chun Plastics Co., Ltd., under product number TNE190A70, and the epoxy equivalent weight is 200-220 g/equivalent weight;

Curing agent 1: it is a phenolic resin, manufactured by Chang Chun Plastics Co., Ltd., under product number PF8090M60, and the active hydrogen equivalent weight is 100-110 g/equivalent weight;

Curing agent 2: it is a phenolic resin, manufactured by Chang Chun Plastics Co., Ltd., under product number PF8110M60, and the active hydrogen equivalent weight is 100-110 g/equivalent weight.

The physical properties of the examples and comparative examples were determined by the methods listed below:

(1) Flame retardancy (UL94-$V_0$): the prepared epoxy resin composition were cured and made into a sample sheet which is 5-inch in length, 0.5-inch in width, and 1/16-inch and 1/8-inch in thickness, respectively, then its flame retardancy was determined according to the specifications of UL94; 5 sample sheets produced with the same composition were each burned twice; the sample piece only passes the test if the total time accumulated from 10 burnings did not exceed 50 seconds, the time for each single burning did not exceed 10 seconds.

(2) $T_g$ (° C.): the prepared epoxy resin compositions were spread over a copper substrate then cured with heating, the cured product was peeled off from the copper substrate, then its glass transition temperature was analyzed by using a thermo-mechanical analyzer (TMA); its testing temperature was set within 50-280° C., and increased 5° C. every minute.

(3) $T_d$ (° C.): the epoxy resin compositions were spread over a copper substrate then cured with heating, the cured composition was peeled off from the copper substrate, then determined a temperature ($T_d$) at which temperature a 5% by weight loss occurred by the use of a thermal gravimetric analyzer obtained from TA Instrument Co. Ltd., Model TA-2910; the testing temperature was set within 50-600° C., and increased 5° C. every minute.

(4) T-288° C.: the epoxy resin compositions were spread over a copper substrate then cured with heating, the cured sheet was peeled off from the copper substrate, then determined the time that the cured sheet maintain its shape at the temperature of 288° C. without deformation through the use of a thermo-mechanical analyzer (TMA) In which the testing temperature was increased from 50 to 288° C. gradually with a increment of 5° C./minute.

EXAMPLES 8 TO 10 AND COMPARATIVE EXAMPLES 3 TO 6

Preparation of Low Bromine Epoxy Resin Compositions

The low bromine epoxy resin compositions were prepared according to the ratio and ingredients listed in Table 2 below, and their flame resistance was tested in accordance with the specifications of IPC-TM-650.

TABLE 2

|  | Example 8 | Example 9 | Example 10 | Comparative Example 3 | Comparative Example 4 | Comparative Example 5 | Comparative Example 6 |
|---|---|---|---|---|---|---|---|
| Epoxy resins | | | | | | | |
| Epoxy resin 2 | 1000 | 1000 | 1000 | 1000 | 1000 | 1000 | 1000 |
| Epoxy resin 5 | 230 | 295 | 295 | 295 | 230 | 230 | |
| Curing agents | | | | | | | |
| DICY Curing agent 1 | | | | | 405.3 | | 23.5 |
| Phenolic resin (D) | 402.3 | 512.8 | | | | | |
| Phenolic resin (A) | | | 447.0 | | | | |
| Phenolic resin (E) | | | | 447.0 | | | |
| Curing agent 2 | | | | | | 405.3 | |
| Solvents | | | | | | | |
| Methyl Ethyl Ketone (MEK) | 270 | 265 | 265 | 265 | 270 | 270 | 290 |
| Properties | | | | | | | |
| Flame Retardance (UL94) | $V_0$ | $V_0$ | $V_0$ | $V_0$ | $V_0$ | $V_0$ | $V_0$ |
| DSC Tg (° C.) | 147 | 148 | 146 | 142 | 134 | 143 | 147 |
| Td (° C.) | 345 | 346 | 345 | 344 | 340 | 342 | 306 |
| T-288° C. (min) | >60 | >60 | >60 | 46 | 35 | 42 | 2.5 |

EXAMPLES 11 TO 13 AND COMPARATIVE EXAMPLES 7 TO 9

Preparation of Bromine-Containing Epoxy Resin Composites with High Tg

The bromine-containing epoxy resin compositions with high Tg were prepared according to the ratio and ingredients listed in Table 3 below, and their flame resistance was tested in accordance with the specifications of IPC-TN-650.

TABLE 3

|  | Example 11 | Example 12 | Example 13 | Comparative Example 7 | Comparative Example 8 | Comparative Example 9 |
|---|---|---|---|---|---|---|
| Epoxy resins | | | | | | |
| Epoxy resin 3 | 1000 | 1000 | 1000 | 1000 | 1000 | 1000 |
| Epoxy resin 5 | 230 | 295 | 295 | 295 | 230 | 230 |
| Epoxy resin 6 | 110 | 120 | 120 | 120 | 110 | 110 |
| Curing agents | | | | | | |
| Curing agent 1 | | | | | 1070.9 | |
| Phenolic resin (D) | 1062.9 | 1372 | | | | |
| Phenolic resin (A) | | | 1181 | | | |
| Phenolic resin (E) | | | | 1181 | | |
| Curing agent 2 | | | | | | 1070.9 |
| Solvents | | | | | | |
| (MEK) | 60 | 45 | 45 | 45 | 60 | 60 |
| Properties | | | | | | |
| Flame Retardancy (UL94) | $V_0$ | $V_0$ | $V_0$ | $V_0$ | $V_0$ | $V_0$ |
| TMA Tg (° C.) | 180 | 182 | 180 | 176 | 160 | 170 |
| TD (° C.) | 360 | 363 | 357 | 359 | 355 | 359 |
| T-288° C. (min) | >90 | >90 | >90 | >60 | 45 | 55 |

EXAMPLES 14 TO 16 AND COMPARATIVE EXAMPLES 10 TO 13

Preparation of Halogen-Free Epoxy Resin Compositions with High Tg

The halogen-free epoxy resin compositions were prepared according to the ratio and ingredients listed in Table 4 below, and their flame resistance was tested in accordance with the specifications of IPC-TM-650.

TABLE 4

|  | Example 14 | Example 15 | Example 16 | Comparative Example 10 | Comparative Example 11 | Comparative Example 12 | Comparative Example 13 |
|---|---|---|---|---|---|---|---|
| Epoxy resins | | | | | | | |
| Epoxy resin 4 | 1000 | 1000 | 1000 | 1000 | 1000 | 1000 | 1000 |
| Epoxy resin 6 | 50 | 50 | 50 | 50 | 50 | 50 | 50 |
| Curing agents | | | | | | | |
| DICY | | | | | | | 25.7 |
| Curing agent 1 | | | | | 374.9 | | |
| Phenolic resin (D) | 372.1 | 454.7 | | | | | |
| Phenolic resin (A) | | | 413.4 | | | | |
| Phenolic resin (E) | | | | 413.4 | | | |
| Curing agent 2 | | | | | | 374.9 | |

TABLE 4-continued

|  | Example 14 | Example 15 | Example 16 | Comparative Example 10 | Comparative Example 11 | Comparative Example 12 | Comparative Example 13 |
|---|---|---|---|---|---|---|---|
| Solvents | | | | | | | |
| MEK | 125 | 120 | 120 | 120 | 125 | 125 | 150 |
| Properties | | | | | | | |
| Flame Retardance (UL94) | $V_0$ | $V_0$ | $V_0$ | $V_0$ | $V_0$ | $V_0$ | $V_0$ |
| TMA Tg (° C.) | 150 | 152 | 150 | 145 | 135 | 145 | 150 |
| Td (° C.) | 390 | 390 | 391 | 392 | 371 | 375 | 345 |
| T-288° C. (min) | >90 | >90 | >90 | >60 | 40 | 50 | 34 |

The figures described in the tables above indicate that by using the phenolic resins prepared according to the invention in which the content of free bisphenol A is below 5 wt % and has a narrow molecular weight distribution (Mw/Mn) being lower than 2.0, as a curing agent, the prepared epoxy resin compositions exhibit flame resistance and meets the requirement of $T_d$>330° C. meanwhile maintain a high glass transition temperature, thus the heat resistance and reliability of a cured article prepared from the present epoxy resin composites are improved.

What is claimed is:

1. A method for producing a phenolic resin, comprising:
   (a) reacting bisphenols with aldehydes in the presence of alkaline catalysts at a temperature of from 0 to 100° C. to obtain a reactive resin;
   (b) neutralizing the reactive resin prepared from (a) by using acids, followed by the addition of phenols, then adding acids to adjust the pH value of the reaction mixture to a range of from 0 to 6, subsequently, heating to a temperature of from 50 to 200° C. and then vacuumed to recover a phenolic resin having not more than 5 wt % of free bisphenol and a molecular weight distribution represented by Mw/Mn of not more than 2.0.

2. The method according to claim 1, wherein in step (a), the bisphenols and aldehydes are used in an amount of from 0.66 to 0.95 equivalent moles of active hydrogen of bisphenols relative to 1 mole of aldehydes.

3. The method according to claim 1, wherein said bisphenols is at least one selected from the group consisting of bisphenol A, bisphenol F, bisphenol E, bisphenol S, bisphenol Z, and bisphenol C.

4. The method according to claim 1, wherein said aldehydes is at least one selected from the group consisting of formaldehyde, formaline, paraformaldehyde, trioxane, acetaldehyde, polyoxymethylene (POM), and propionaldehyde.

5. The method according to claim 1, wherein the alkaline catalysts used in step (a) is at least one selected from the group consisting of sodium hydroxide, potassium hydroxide, barium hydroxide, and calcium hydroxide, and it is used in amount of from 0.1 to 2.0 moles relative to 1 mole of bisphenols.

6. The method according to claim 1, wherein the reaction of bisphenols and aldehydes in step (a) is conducted out at a temperature of from 0 to 100° C.

7. The method according to claim 1, wherein in step (b), the phenols is at least one selected from the group consisting of phenol, o-methylphenol, m-methylphenol, p-methylphenol, para-tert-butyl-phenol, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, and p-ethylphenol.

* * * * *